United States Patent [19]

Lindholm et al.

[11] 4,236,926

[45] Dec. 2, 1980

[54] HARD METAL BODY

[75] Inventors: Leif S. Lindholm, Hägersten; Jan N. Lindström, Norsborg, both of Sweden

[73] Assignee: Sandvik Aktiebolag, Sandviken, Sweden

[21] Appl. No.: 946,652

[22] Filed: Sep. 28, 1978

[30] Foreign Application Priority Data

Sep. 28, 1977 [SE] Sweden ............................. 7710826

[51] Int. Cl.³ .................... B22F 3/00; C22C 29/00
[52] U.S. Cl. ...................................... 75/238; 75/202; 75/208 R; 428/552; 148/126
[58] Field of Search ................. 75/208 R, 202, 238; 148/126; 428/552

[56] References Cited

U.S. PATENT DOCUMENTS

| | | | |
|---|---|---|---|
| 3,647,576 | 3/1972 | Yamamura et al. | 75/202 |
| 3,999,954 | 12/1976 | Kolaska et al. | 75/208 R |

*Primary Examiner*—Brooks H. Hunt
*Attorney, Agent, or Firm*—Burns, Doane, Swecker & Mathis

[57] ABSTRACT

A sintered hard metal body composed of at least one carbide as tungsten carbide and a binder phase consisting essentially of cobalt and/or nickel, the hard metal body being provided with a boronized surface zone having a thickness of 1–100 $\mu$m characterized in that the hard metal contains small additions of up to about 5 percent by volume of the hard metal body of cubic carbides as VC, TiC, TaC, $Mo_2C$, ZrC, NbC and/or $Cr_3C_2$, the content of binder phase is 6–40% of the volume of the body, and the mean grain size of the tungsten carbide is 0.2–1.5 $\mu$m. The process of forming said body is also disclosed.

12 Claims, No Drawings

ND BODY

BACKGROUND OF THE INVENTION

The present invention relates to a sintered hard metal, i.e., a cemented carbide, body having an essentially increased wear resistance obtained by boronizing the cemented carbide.

Sintered hard metal bodies consisting of at least one carbide and a binder metal have a versatile application in industry. They are used in cutting and for details exposed to heavy wear. A great resistance to wear is, as understood, a very important property in many of these applications.

It is known that diffusion zones of boron or thin layers of borides, carbides or nitrides on the surface of a hard metal body can considerably increase the surface hardness of a detail. Also, particles of diamond or cubic boron nitride, possibly together with a binder phase consisting of Co, Ni, Ti or other metals, have been used as layers on hard metal or by themselves as homogenous bodies.

The above-mentioned bodies have been developed particularly for applications demanding high wear resistance. In these applications the applied layers often flake (or splinter if they are thick) because of mechanical strains. Furthermore, the improved high temperature properties (as chemical stability, oxidation properties) of the boride-, carbide- or nitride-layers, compared to untreated hard metal, cannot be exploited if the working temperature is below about 600° C., which often is the case in applications outside the field of chip-forming metal cutting. Products containing diamond or cubic boron nitride in the form of layers or as solid bodies are not often used because of their expensive cost.

In hard metal products, known up to now, having diffused zones of boron, the boronized zones have been of unsatisfactory quality and thickness. Often, the surface zone has been so thin that it was prematurely broken through because of wear. This means that the increased wear resistance of the surface zone is not fully exploited. Furthermore, thick surface zones mean that working operations as polishing, grinding, lapping, etc., can be used after the boronizing.

Processes developed for boronizing steel have normally been used for boronizing cemented carbide, which means that the process has not been as well controlled as needed for boronizing multiphase materials like cemented carbide. In addition, the cemented carbide substrate has not been a particular grade optimum for boronizing.

Materials containing boron and being used as boron donors in boronizing are available in all three physical states. For steel, good results have been obtained by packing methods using powdered boron compounds or phases together with, e.g., aluminum oxide powder and possibly "activators." Very little progress has been obtained, however, with methods exploiting liquid phases (salt melts), including the use of electrolysis. Thus, the high viscosity of such phases means that the process conditions have been difficult to control.

It has also not been possible to use gas boronizing, the method offering the best means of control in the optimum way. Thus, it has not been possible to avoid a too vigorous boronizing which means, among other things, a considerable embrittlement of the boronized surface zone and the presence of free boron on the hard metal surface. Also, zones which are too thin have been obtained. The reason is that only two groups of gaseous boron compounds are known, the boranes and the borontrihalides. The boranes are very poisonous and expensive while the use of borontrihalides has been considered as leading to a vigorous corrosion of the substrate.

SUMMARY OF THE INVENTION

According to the present invention, it has now been found, however, quite unexpectedly, that excellent results can be obtained in boronizing of cemented carbide if the composition and structure of the cemented carbide are adjusted or optimized in a certain way.

The hard metal, preferred as the material being boronized, contains tungsten carbide as the main component as well as small additions of cubic carbides as VC, TiC, TaC, $Mo_2C$, ZrC, NbC and/or $Cr_3C_2$ and a binder metal which should be mainly cobalt or nickel or mixtures of those metals. The content of the binder phase can vary between 6–40% by volume, but 8–20% by volume is preferable.

The content is preferably less than 15% by volume. It is important for obtaining the favorable results according to the invention, that the mean grain size of the WC grains lies between 0.2–1.5 $\mu$m and preferably between 0.2–1 $\mu$m. Suitably, the mean grain size should be at the most 0.8 $\mu$m, i.e., a very fine-grained hard metal grade.

The principle purpose of the additional carbides (VC, TiC, TaC, NbC, ZrC, $Mo_2C$ and/or $Cr_3C_2$) is to reduce the mean grain size of the tungsten carbide main component. As these additional carbides dissolved in Co have an impeding action on the growth of the boronizing zone, they should be kept, however, at as low content as possible to accomplish the desired function. It has been found that the content of additional carbides should be at the most ½, preferably at the most ¼, of the binder phase content, up to a maximum additional carbide content of 5 percent, the contents of each being given in percent by volume of the hard metal body. It is surprising, however, that good results are obtained with cemented carbide having such small grain size that additives which impede the boronizing process, are also used in their capacity as growth inhibitors of the carbide grains. The additional carbides should be present in an amount of at least 0.1%, preferably at least 0.2%, by volume of the hard metal body. Suitable amounts of the additional carbides have proved to be 0.3–5.0, often 0.4–2.0, % by volume of the hard metal body.

As set forth in more detail hereinbelow, the effectiveness of a gas boronizing treatment is substantially enhanced as compared to treatments with known tungsten carbide-containing hard metal bodies when the hard metal body is composed as described herein. Particularly good results are obtained with a process for boronizing the surface of a cemented carbide body, the said body containing at least one carbide as tungsten carbide, from 6 to 40% by volume of the body of a binder phase consisting essentially of cobalt and/or nickel, and small additions of up to about 5% by volume of the hard metal body of cubic carbides as VC, TiC, TaC, $Mo_2C$, ZrC, NbC and/or $Cr_3C_2$, the mean grain size of the tungsten carbide being 0.2 to 1.5 $\mu$m, comprising contacting the said cemented carbide body at a temperature of from about 750° to 1000° C. with a first gaseous mixture of a boron trihalide and a hydrogen halide, to form a thin boronized layer on said body and thereafter increasing the amount of the hydrogen halide to form a second gaseous mixture to complete boronizing of said hard metal body to a thickness of from 1 to 100 μm.

DETAILED DESCRIPTION OF THE INVENTION

A typical analysis of cemented carbide used in the present invention is:
Co: 10.0% by volume
Ni: <0.20% by volume
Fe: <0.20% by volume
TiC, TaC, NbC: 0.70% by volume
WC: Remainder
Mean grain size of WC: 0.8 μm The carefully adjusted mean grain size of the tungsten carbide main component phase of the hard metal material is necessary for obtaining favorable results in the boronizing operation. It has been found that at the relatively high temperatures normally used in boronizing, the grain bonding diffusion and not the bulk diffusion determined the rate of the growth of the boronized zone. It has also been found, that the phenomenon—which is known per se—that a decreased carbide grain size of the hard metal (with other structure parameters unchanged) leads to increased wear resistance, is strengthened when it concerns the wear resistance of the boronized surface zone.

Generally, in boronizing cemented carbide, the strength of the material—measured by means of bending strength testing of samples—is decreased after the material has been boronized. It has now surprisingly been found, however, that this decrease is the smallest if the test sample is prepared from a fine-grained hard metal grade and the content of binder metal, i.e., normally Co, in the hard metal is small. As an example, a 10-fold increase in the wear resistance has been obtained at the same time as the decrease of the bending strength was less than 10%. This means normally a great increase of the life or a great improvement of the quality of the cemented carbide.

Surface zones thicknesses from 1–100 μm, preferably 20–80 μm, having very good uniformity, can be obtained with good process economy if one starts from the hard metal which has been specified in the preceeding description. At zone depths of over 100 μm, the risks of damaging the hard metal details are increased. Normally, boronizing zones having thicknesses above 30 μm have been produced. These are considerably deeper zones than have heretofore been possible to obtain before without damaging the hard metal.

Boronized cemented carbide bodies according to the invention are used particularly in applications in which the working temperature is below about 700° C., or in such uses in which only slight dimensional deviations because of wear can be tolerated. This includes bodies or inserts for cutting at low temperature, e.g., milling of Al-alloys, and wear parts being only slightly worn down.

Boronizing of the cemented carbide in accordance with the present invention is suitably done by means of CVD-technique (Chemical Vapor Deposition) which means treating the hard metal body or substrate at an increased temperature in a reactor or reaction vessel by a gas mixture containing boron trihalide hydrogen and possibly an inert gas. The treatment means essentially a reduction of the boron trihalide by hydrogen gas. When boron trichloride is used, the reaction can be illustrated by means of the formula $2\ BCl_3 + 3H_2 = 2B + 6\ HCl$, in which B does not necessarily mean only elementary B. From the reaction formula it is evident that the equilibrium is strongly influenced of changes in the concentration of HCl.

In earlier known procedures for the boronizing of cemented carbide, it has been found that the deposition of boron has been done too rapidly in most cases and that precipitation of elementary boron has taken place in the gas phase or on the cemented carbide. Such coatings, which normally are amorphous, are brittle and have a very unsatisfactory surface smoothness.

In hard metal bodies according to the invention, the mentioned drawbacks have been diminished or eliminated by using a high concentration of hydrogen halide (e.g., HCl) by which it has been possible to decrease the "boronizing potential" of the process gas, i.e., the concentration or content of boron trihalide in the gas. Generally, the process gas contains from about 0.3 to about 3 percent by volume of the gas of the boron trihalide. Said boronizing has been applied on a cemented carbide substrate being optimized regarding its composition and structure. The increased concentration of hydrogen halide causes, however, a corroding of the cemented carbide. This further problem has been solved by varying the "boronizing potential" of the process gas during the very course of the boronizing. In a first step, a low addition of hydrogen halide (that is, from about ½ to 2 percent by volume of the process gas) is used when the possibility of the substrate to take up boron is large (the powder to take up boron decreases with increased contents of boron in the substrate) and a thin boronized zone is formed which protects the hard metal against further corrosion. This permits an increase of the concentration of hydrogen halide (that is, up to about 2 to 5 percent by volume of the process gas) in one or more further steps, which according to above, will decrease the "boronizing potential" and help to avoid over-boronizing. The substrate can also be contacted initially for a short period of time with a boron trihalide-inert gas mixture to form a thin, corrosion-resistant boron layer prior to contact with the low hydrogen halide-containing gas mixture. It will be understood that the halide of the boron trihalide and of the hydrogen halide are the same.

In the boronizing process, the hard metal bodies are heated to 750°–1000° C. Usually, a temperature between 850° C. and 925° C. has been most suitable. It has been found that treating the hard metal substrate at high temperatures, i.e., above about 950° C., there are increased risks of damaging the bodies. Cracks are often formed in corners and for kinetic reasons undesired boronizing of the carbide cannot be sufficiently restrained by control of the process variables. On the other hand, it has been found unfavorable to coat the hard metal substrate at a lower temperature, i.e., below about 750° C., mainly because the growth of the boronizing zone will be so low that the length of the process time is unacceptable. The process can preferably be done at atmospheric pressure, but superatmospheric as well as subatmospheric pressure have been used under particular circumstances.

The favorable possibilities for controlling the gas boronizing process, the excellent means of reproduction and the uniformness of the zone thickness through the whole reaction vessel and between different boronizing runs have shown that the zone thickness can be well described as follows by means of a parabolic equation derived from Fick's second law in a conventional way for non-stationary diffusion courses in respect to time, t, and by means of a exponential function regarding the temperature in the actual temperature interval during the boronizing:

$$y^2/t = \exp\left(A \frac{T - 1023}{T} + B\right)$$

in which
y = zone thickness (in μm)
t = time (h)
T = temperature (°K)
A and B = constants With values of A between 20–40 and of B between 1–3, the above equation is valid for those hard metal substrates which can preferably be boronized by means of the described method.

The invention is additionally illustrated in connection with the following Examples which are to be considered as illustrative of the present invention. It should be understood, however, that the invention is not limited to the specific details of the Examples.

From the following Examples the properties of hard metal bodies according to the invention will be further illustrated. In the Examples there are given results of comparison tests and there are described process conditions used in making the products.

EXAMPLE 1

Hard metal bodies, some of them having a composition according to the earlier given typical grade analysis, the remainder having a composition according to the analysis given below, were treated by means of a boronizing process described in more detail in Example 3 (the temperature, however, being 850° C.).

Co—10.0% by volume
Ni—<0.20% by volume
Fe—<0.20% by volume
TiC—<0.10% by volume
TaC—<0.10% by volume
NbC—<0.10% by volume
WC—remainder
WC grain size 3.9 μm (mean)

In the treatment, the boronizing zone of the hard bodies of the first mentioned grade (having a mean grain size of 0.8 μm) had a mean depth of 37 μm, while the bodies of the grade having a WC grain size of 3.9 μm obtained a mean zone depth of only 14 μm, which was unsatisfactory.

The zone depth had a variation of ±3 μm through the charge (measured on a polished section in a metal microscope after etching with Marbel's etchant). Mean value and variation were measured on 10 bodies from different levels in the charge corresponding to "top," "middle" and "bottom." By successive grinding of the boronized surface zone a phase analysis could be performed on different zone depths by means of X-ray diffraction. The boronized zone proved to consist of three sub-zones. Also the hardness was measured by using a Vicker diamond and a load of 0.49 N.

The results are given in the Table below: (given only for products according to the invention).

| Subzone No. from the surface | Subzone limits, μm | Phases in phase analysis | Hardness (mean value) HV (0.49 N) |
|---|---|---|---|
| 1 | 0–3 | WC, CoB, $W_2B_5$ | 3200 |
| 2 | 3–24 | WC, CoB, WCoB-phases | 2700 |
| 3 | 24–37 | WC, $W_2Co_{21}B_6$ | 2600 |
| substrate | — | WC, Co | 1700 |

The boronized bodies together with non-boronized bodies of the same grades were wear-tested according to a method, CCPA (Cemented Carbide Producers Association) P-112, in which the hard metal body is pressed against the periphery of a rotating steel disk partly reaching into a slurry of aluminum oxide in water. The wear was measured after 20 and 200 revolutions for the various hard metal bodies.

| Hard metal body with WC grain size | Boronized | Wear ($mm^3$) 20 rev. | Wear ($mm^3$) 200 rev. |
|---|---|---|---|
| 0.8 μm | No | 1.25 | 12.30 |
| 0.8 μm | Yes | 0.04 | 0.38 |
| 3.9 μm | No | 7.70 | 75.40 |
| 3.9 μm | Yes | 1.20 | 68.50 |

From the results, it is evident that the hard metal grade with the smaller grain size had a considerably better wear resistance than that with the larger size, particularly at extended testing times.

Also strength tests, in the form of bending strength testing according to SIS 112618, were performed on the boronized and the non-boronized bodies of the same grades as well. 20 bodies per variant were tested. The following results were obtained:

| Carbide grain size | Boronized | Strength $\sigma Bb$ ($N/mm^2$) | Relative value |
|---|---|---|---|
| 0.8 | No | 1660 | 1.0 |
| 0.8 | Yes | 1570 | 0.95 |
| 3.9 | No | 2150 | 1.0 |
| 3.9 | Yes | 1525 | 0.71 |

From the results, it is obvious that the decrease of the strength because of the boronizing was very slight (5%) for the fine-grained hard metal grade, while the decrease was considerably (about 30%) for the coarse-grained grade.

EXAMPLE 2

Hard metal cutting inserts or a grade having a composition according to the earlier given type analysis were boronized according to Example 3

Boronized hard metal inserts were tested in a flat face milling operation together with untreated inserts of the same grade and also with inserts consisting of a 500 μm thick layer of diamond applied on a cemented carbide substrate containing 16% by volume of Co. The material being cut was die casting containing 88% (by weight) Al and 12% (by weight) Si.

| cutting data: Insert material: | Cemented carbide | Boronized cemented carbide | diamond |
|---|---|---|---|
| Speed (m/s) | 980 | 980 | 980 |
| Cutting depth (mm) | 4 | 4 | 4 |
| Feed (mm/rev) | 0.6 | 0.6 | 0.6 |
| Number of details | 4,000 | 90,000 | 120,000 |

The number of details being possible to cut was determined by the dimensional tolerances and the demands on surface smoothness of the billet. Thus, when the influence of destroying phenomena as flank wear of the cutting edge becomes too strong, the desired dimensional tolerances and surface smoothness cannot be obtained. If the flank wear, etc., results in a blunt edge also the wear forces will increase considerably (~50%). As evident from the results, a great advantage was obtained by the boronizing. Thus, the boronized cutting inserts showed about the same quality in the cutting operation as the considerably more expensive diamond inserts.

EXAMPLE 3

Hard metal bodies (type nozzles with the dimensions $\phi y=19.90$ mm, $\phi i=4.39$ mm, height=27.5 mm and internal surface roughness Ra=0.20) were made in a cemented carbide grade containing 16.6% by volume of Co, 0.70% by volume of $Cr_3C_2$, remainder WC and having a mean grain size of WC=0.6 $\mu$m. In a boronizing process, the bodies were heated to a temperature of 910° C. for 1 hr in a gas mixture of 2% $BCl_3$ and the remainder $H_2$.

During this period of the boronizing operation, there was obtained a boronized zone being protective against corrosion. After that, a one percent of HCl was added to the gas. 5 hours later, the content of HCl was increased to 3%. After another 8 hours, the furnace was turned off and only a low cooling flow of $H_2$ remained.

The boronized hard metal bodies had a mean surface zone depth of 72 $\mu$m. The surface roughness of the internal hole walls had not been changed because of the treatment.

The hard metal bodies, the boronized as well as the untreated ones of the above-mentioned grade, were tested in an application, in which a mass—containing among other things, 10% by weight of $SiO_2$ particles with 30% of the particles lying within the size range of 44–50 $\mu$m and 70% of the particles being within the size range 44 $\mu$m—was pressed through the nozzle with a relative speed between nozzle and mass being 14–18 m/s. The permitted wear of the inner diameter was 120 $\mu$m. A mean life increase of 1700% was obtained for the boronized bodies, compared to untreated hard metals.

EXAMPLE 4

Hard metal bodies, some of them having a composition according to the earlier mentioned type analysis, the rest having the composition given below, were treated by the boronizing process mentioned in Example 3 (the temperature, however, being 850° C.).
Co—23.0% by volume
Ni—<0.20% by volume
Fe—<0.20% by volume
TiC—<0.10% by volume
TaC—<0.10% by volume
NbC—<0.10% by volume
WC—remainder
WC grain size 3.5 $\mu$m (mean)

In the boronizing process, the hard metal bodies of the first mentioned grade (with a mean grain size of 0.8 $\mu$m) obtained a mean depth of the boronized zone of 37 $\mu$m, while the bodies in the more coarse-grained and cobalt-rich grade obtained only a mean zone-depth of 12 $\mu$m.

Strength tests, in the form of bending strength testing according to SIS 112618, were performed on the boronized as well, as on the untreated bodies in the same grade. 20 bodies were tested per variant.

The following results were otained:

| Grain Size | % Co by vol. | Co by weight | Boron-ized | Strength $\sigma Bb$ (N/mm$^2$) | Relative value |
|---|---|---|---|---|---|
| 0.8 | 10 | 6 | No | 1660 | 1.0 |
| 0.8 | 10 | 6 | Yes | 1570 | 0.95 |
| 3.9 | 23 | 15 | No | 2800 | 1.0 |
| 3.9 | 23 | 15 | Yes | 1480 | 0.53 |

From the results, it is obvious that the increased content of Co has caused a further decrease of the strength (about 50%) in the boronized body relative to the corresponding untreated material, compared with the results in Example 1. This is most remarkable, as an increase of the binder metal in cemented carbide generally causes an increases of the bending strength of the material.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A sintered hard metal body composed of at least one carbide as tungsten carbide and a binder phase consisting essentially of cobalt and/or nickel, the hard metal body being provided with a boronized surface zone having a thickness of 1–100 $\mu$m characterized in that the hard metal contains small additions of up to about 5 percent by volume of the hard metal body of cubic carbides as VC, TiC, TaC, Mo$_2$C, ZrC, NbC and/or Cr$_3$C$_2$, the content of binder phase is 6–40% of the volume of the body, and the mean grain size of the tungsten carbide is 0.2–1.5 $\mu$m.

2. The hard metal body of claim 1, wherein the content of the binder phase is from 8 to 20% of the volume of the body.

3. The hard metal body of claim 1, wherein the content of the binder phase is less than 15% by volume.

4. The hard metal body of claim 1, wherein the mean grain size of the tungsten carbide is from 0.2 to 1 $\mu$m.

5. The hard metal body of claim 4, wherein the mean grain size of the tungsten carbide is at the most 0.8 $\mu$m.

6. The hard metal body of claim 1, wherein the additional carbide is present in an amount of at least 0.1% of the volume of the body.

7. The hard metal body of claim 6, wherein the additional carbide is present in an amount of at least 0.2%.

8. The hard metal body of claim 1, wherein the additional carbide is present in an amount of at the most ¼ of the binder phase content.

9. The hard metal body of claim 8, wherein the additional carbides are present in an amount of from about 0.3 to 5.0% by volume of the hard metal body.

10. A process for boronizing the surface of a cemented carbide body, the said body containing at least one carbide as tungsten carbide, from 6 to 40% by volume of the body of a binder phase consisting essentially of cobalt and/or nickel, and small additions of up to about 5 percent by volume of the hard metal body of cubic carbides as VC, TiC, TaC, Mo$_2$C, ZrC, NbC and/or Cr$_3$C$_2$, the mean grain size of the tungsten carbide being 0.2 to 1.5 μm, comprising contacting the said cemented carbide body at a temperature of from about 750° to 1000° C. with a first gaseous mixture of a boron trihalide and a hydrogen halide, to form a thin boronized layer on said body and thereafter increasing the amount of the hydrogen halide to form a second gaseous mixture to complete boronizing of said hard metal body to a thickness of from 1 to 100 μm.

11. The process of claim 10, wherein the first mixture contains from ½ to 2 percent hydrogen halide and the second mixture contains 2 to 5 percent hydrogen halide.

12. The process of claim 10, wherein the temperature is from 850° to 925° C.

* * * * *